United States Patent [19]

Brixius et al.

[11] 4,222,909
[45] Sep. 16, 1980

[54] COATING COMPOSITIONS COMPRISING ISOCYANATE-FUNCTIONAL POLYMERS CONTAINING A TERMINAL THIOALKYL GROUP

[75] Inventors: Darryl W. Brixius, Allentown, Pa.; John A. Simms, Wilmington, Del.

[73] Assignee: E. I. Du Pont de Nemours and Company, Wilmington, Del.

[21] Appl. No.: 917,283

[22] Filed: Jun. 20, 1978

Related U.S. Application Data

[62] Division of Ser. No. 819,121, Jul. 26, 1977, abandoned.

[51] Int. Cl.² .................. C08L 75/02; C08L 91/00
[52] U.S. Cl. .................. 260/18 TN; 260/18 EP; 260/23.5 R; 525/404; 525/409; 525/418; 525/440; 525/450; 525/452; 525/454; 525/455; 525/535; 528/75
[58] Field of Search ............ 526/312; 260/858, 859, 260/875, 23.5 R, 18 TN, 18 EP; 528/75; 525/404, 409, 418, 440, 450, 452, 454, 455, 535

[56] References Cited

U.S. PATENT DOCUMENTS 2,718,516  9/1955  Bortnick .......................... 526/312
3,943,159  3/1976  Quiring et al. .................. 260/453 P Primary Examiner—J. Ziegler

[57] ABSTRACT

Low molecular weight isocyanate-functional acrylic polymers are provided, which contain at least 10% by weight of copolymerized isocyanatoalkyl (meth)acrylate, are substantially free of toxic monomeric isocyanates, and have the following general structure:

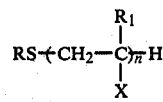

where
R is alkyl or aryl,
$R_1$ is hydrogen or methyl;
X is COO—A—NCO or a mixture of COO—A—NCO and at least one of phenyl, $COOR_2$,

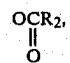

Cl, H; where
A is an alkylene group having 2-6 carbon atoms, and
$R_2$ is an alkyl group having 1-18 carbon atoms; and n is 2-400.

These polymers can be crosslinked and are useful in a variety of applications such as finishes, pigment surface treatments and dispersants, and rheology control agents.

12 Claims, No Drawings

COATING COMPOSITIONS COMPRISING ISOCYANATE-FUNCTIONAL POLYMERS CONTAINING A TERMINAL THIOALKYL GROUP

This is a division of application Ser. No. 819,121, filed July 26, 1977, abandoned.

BACKGROUND OF THE INVENTION

1. Field of Invention:

This invention relates isocyanate-containing acrylic polymers and more particularly to low molecular weight polymers having a terminal thioalkyl group and low toxicity.

2. Prior Art:

Acrylic polymers containing pendent isocyanate groups are known.

U.S. Pat. No. 2,718,516, issued Sept. 20, 1955 to N. M. Bortnick, describes high molecular weight polymers, containing a plurality of isocyanate groups, based on (meth) acrylic ester isocyanates. The polymers obtainable by the described method are often intractable when the polymerization is carried to completion or when high levels of the isocyanate monomers are used during the polymerization.

Other types of organic polyisocyanates useful as crosslinking agents are also well known.

U.S. Pat. No. 3,124,605, issued Mar. 10, 1964, to K. Wagner, describes low molecular organic polyisocyanates having the following biuret structure:

$$\text{OCN}-\text{R}-\text{N}-\overset{\overset{\text{O}}{\|}}{\text{C}}-\text{NX}-\text{R}-\text{NCO}$$
$$\begin{array}{c}|\\ \text{C}=\text{O}\\|\\ \text{NX}\\|\\ \text{R}\\|\\ \text{NCO}\end{array}$$

where R is an aliphatic, hydroaromatic, araliphatic, including aralkyl, or an aromatic radical, which may or may not be substituted; and X is hydrogen or —CO—NX—R—NCO. A commercially available example of such an isocyanate, where R is $(CH_2)_6$ and X is hydrogen, has recently been found to contain, upon aging, excessive levels of a residual monomeric diisocyanate, thereby increasing the toxicity.

SUMMARY OF THE INVENTION

According to the present invention there is provided an acrylic polymer, prepared in a substantially nonaqueous medium, and containing at least 10%, by weight of the polymer, of copolymerized isocyanatoalkyl acrylate or isocyanatoalkyl methacrylate, having the following general structure:

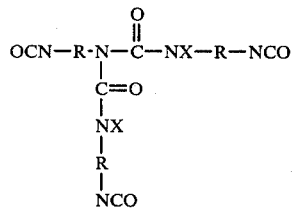

where

R is alkyl or aryl, $R_1$ is hydrogen or methyl;

X is COO—A—NCO or a mixture of COO—A—NCO and at least one of phenyl, $COOR_2$,

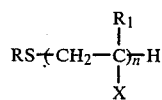

Cl, H; where

A is an alkylene group having 2–6 carbon atoms, and $R_2$ is an alkyl group having 1–18 carbon atoms;

and n is 2–400 so that the polymer has a number average molecular weight, determined by gel permeation chromatography, utilizing polystyrene standards of polydispersity less than 1.1, of 500–10,000;

said polymer, in turn, comprising at least 10% by number of the acrylic polymer molecules resulting from a polymerization process initiated by conventional initiators and mercaptan chain transfer agents.

There are further provided crosslinkable coating compositions based on the isocyanate-functional acrylic polymers and crosslinking agents containing complementary functional groups, such as hydroxyl, carboxyl or amino.

When used in this application, "consisting essentially of" is intended to have its customary meaning: namely, that all specified materials and conditions are very important in practicing the invention but that unspecified materials and conditions are not excluded so long as they do not prevent the benefits of the invention from being realized.

DESCRIPTION OF THE INVENTION

The isocyanate-functional acrylic polymers of this invention can be homopolymers or copolymers of isocyanatoalkyl acrylates or isocyanatoalkyl methacrylates and contain at least one terminal thioalkyl group for every ten polymer molecules.

Among the isocyanato monomers are isocyanatoethyl acrylate, isocyanatoethyl methacrylate (ICEMA), isocyanatobutyl acrylate, isocyanatobutyl methacrylate, isocyanatohexyl acrylate, and isocyanatohexyl methacrylate. ICEMA is a preferred monomer from the standpoint of ease of copolymerization and availability.

The acrylic polymers contain at least 10% by weight of the polymer of the isocyanate monomer, preferably 15–50% and most preferably 25%. For certain applications, no additional monomer is necessary and the homopolymer can be used.

Among other monomers which can be used to copolymerize with the isocyanate monomer, i.e., to provide polymers where not all X in the formula below is —COO—A—NCO, are the following: alkyl acrylates having 2–12 carbon atoms in the alkyl group, such as ethyl acrylate, butyl acrylate, 2-ethylhexyl acrylate, alkyl methacrylates having 1–12 carbon atoms in the alkyl group, such as methyl methacrylate, the isomeric butyl methacrylates, hexyl methacrylate, 2-ethylhexyl methacrylate; styrene; ethylene; vinyl esters such as vinyl acetate; vinyl chloride or mixtures of any of the foregoing.

These monomers can be present at levels not exceeding 90% by weight of the polymer or can be absent. Preferably, these monomers comprise 85 to 10% by weight of the polymer, and most preferably 50 to 75%.

The polymers of this invention have low molecular weights, the number average molecular weight ranging from 500 to 10,000 and preferably from 1,000 to 5,000. To obtain these molecular weight ranges it is conventional technique to utilize either high levels of initiators or chain transfer agents.

It has been found unexpectedly, that in spite of the general reactivity of isocyanate groups with compounds containing groups having active hydrogens, the polymers of this invention can be prepared using mercaptans as chain transfer agents. During the polymerization reaction, substantially no isocyanate groups in the isocyanate containing monomers are consumed by the —SH functionality of the mercaptan chain transfer agent and polymers having the following general formula result:

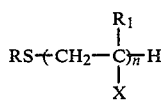

where
R is alkyl or aryl,
$R_1$ is hydrogen or methyl;
X is COO—A—NCO or a mixture of COO—A—NCO and at least one of phenyl, $COOR_2$,

Cl, H; where
A is an alkylene group having 2-6 carbon atoms, and
$R_2$ is an alkyl group having 1-18 carbon atoms;
and n is 2-400 so that the polymer has a number average molecular weight, determined by gel permeation chromatography, utilizing polystyrene standards of polydispersity less than 1.1, of 500-10,000.

In gel permeation chromatography, a solution of the material under investigation is passed through a series of columns containing porous beads, each column being packed with beads of a given porosity. As the solution passes through the columns, the various components diffuse into the beads and out again insofar as molecular volume and pore size are compatible. Since the smaller molecules can diffuse into more pores, they take longer to elute and are separated from the larger molecules which elute quickly.

For the polymeric systems of this invention, samples are dissolved in tetrohydrofuran to obtain an approximately 0.5% solution weight/volume and are passed through a system of Styragel ® columns having porosities of $10^4$, $10^3$, and 60 A° at a flow rate of 1 ml./min. at room temperature. The location (molecular weight) and amount of material eluting are indicated by a differential refractometer. The system is calibrated by measurements on polystyrene standards having a polydispersity of less than 1.1.

Molecular weights are computer calculated on the basis of the polystyrene calibrations from data digitized and recorded on tape for reading into a PDP-10 computer using a program modifying the procedure of Pickett, Cantow, and Johnson, J. Applied Polymer Sci., 10, 917–924 (1966) and J. Polymer Science (C), (21), 67–81 (1968). This gives an accurate comparison of the molecular weights and molecular weight distributions of similar resins. The absolute accuracy of the molecular weights depends on how closely the molecular weight/molecular volume relationship of the polymer corresponds to the molecular weight/molecular volume relationship of the polystyrene standard.

The resulting polymer contains as many thioalkyl groups per polymer molecule as are dictated by the equivalent ratio of chain transfer agent to initiator. For the purposes of this invention, this ratio cannot be less than 1:10, yielding a polymer wherein at least 10% by number of the acrylic polymer molecules contain molecules of the structure indicated above. Preferably, 25-40% of the resulting polymer molecules will have the indicated structure.

The amount of chain transfer agent used can be determined by a number of factors, among others: desired molecular weight of the polymer and the desired ratio of number of polymer molecules having terminal thioalkyl groups to other, initiator related, terminal groups. Chain transfer agent can be present from 1-20% by weight of the polymer, preferably 3 to 15% and most preferably 5-9%.

The polymers are generally prepared in solution in a substantially non-aqueous medium.

Among useful solvents for the preparation of the isocyanate functional acrylic polymers are the following: toluene, xylene, ethyl acetate, butyl acetate, cyclohexane, heptane, methyl isobutyl ketone, ether esters, N-methyl pyrrolidone, and the like.

Various polymerization initiators can be used to catalyze the polymerization of the isocyanate-monomers alone or in combination with other monomers, for example, azobisisobutyronitrile, tert-butyl peroctoate, tert-butyl perbenzoate, benzoyl peroxide.

Among the mercaptan chain transfer agents, the following are suitable: octyl mercaptan, lauryl mercaptan, butyl mercaptan, tert-dodecyl mercaptan, benzyl mercaptan, benzene thiol, cyclohexyl mercaptan, with lauryl mercaptan and tert-dodecyl mercaptan being the preferred ones.

Other chain transfer agents can also be utilized including, in addition to some of the traditional chain transfer agents, disulfides and terminal olefins.

Depending on the type and amount of initiator, type and amount of chain transfer agent, and their ratio to each other, the molecular weight and polydispersity of the final polymer can be regulated as necessary. The number average molecular weight range of the polymer of this invention is 500-10,000 with a polydispersity not exceeding 4.

In order to achieve the non-toxic final polymers, substantially free of toxic monomeric isocyanates, it is preferred that the polymerization itself be carried out by feeding monomer to the polymerization vessel in a predetermined manner. The relative feed rates of various monomers can be calculated from the reactivity ratios of the monomers to be copolymerized.

The absence of residual monomeric isocyanate from the polymeric product leads to a level of safety unknown in moisture curing finishes based on oligomers and adducts made from difunctional isocyanates such as hexamethylene diisocyanate, bis-cyclohexyl methanediisocyanate, isophorone diisocyanate, and 2,4-toluene diisocyanate. Isocyanatoethyl methacrylate is at least 10 times less toxic by inhalation than these diisocyanates and can be readily copolymerized to a free isocyanate level 10 to 1000 times lower than is usually found in conventional diisocyanate-based polyisocyanates.

The isocyanate-functional polymers of this invention can be utilized as crosslinking agents. Owing to their relatively low molecular weight and low toxicity, such polymers can be substituted for conventional organic polyisocyanates in a variety of coatings applications.

Polymers containing complementary functional groups such as hydroxyl, amino or carboxyl, when cured with the isocyanate-functional polymers, afford coatings of excellent flexibility and durability. Polymer-captans can also be used when in the presence of tertiary amine catalysts.

A wide variety of ethylenically unsaturated monomers can be used to prepare the backbone of the hydroxyl containing polymer used to form the coating composition of this invention. Typical monomers that can be used for the backbone are, for example, vinyl chloride, vinylidene chloride; olefins, such as ethylene, propylene and the like; vinyl acetate; conjugated dienes having 4 to 10 carbon atoms, such as butadiene; aromatic hydrocarbons having vinylene groups, such as styrene, alkyl substituted styrene, such as α-methyl styrene; alkyl maleates, such as dibutyl maleate; vinyl pyrrolidone; methacrylonitrile, acrylonitrile; esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid, and the like.

Particularly useful monomers or combinations of monomers which form the backbone of high quality polymers used to form the coating composition of this invention are, for example, styrene, methyl methacrylate, butyl methacrylate, ethyl acrylate, acrylonitrile, and vinyl pyrrolidone.

Preferred hydroxyalkyl monomers used for forming the polymer used in this invention are, for example, hydroxyethyl methacrylate, hydroxypropylemethacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain 2–4 carbon atoms.

Carboxyl group containing polymers suitable for crosslinking with the isocyanate-functional polymers include polyesters and addition polymers which contain copolymerized monomeric acids, such as acrylic acid, methacrylic acid, itaconic acid, maleic acid, and the like.

Suitable amine-functional polymers can be prepared e.g., by copolymerizing ethylenically unsaturated monomers with such monomers as, for example, N-tertiary-butylaminoethyl methacrylate.

The isocyanate-functional polymers can also function as the polymers to be crosslinked with low molecular weight polyfunctional materials containing complementary functional groups. Among these functional groups are hydroxyl, amino, and carboxyl groups.

Examples of such low molecular weight polyfunctional materials are monomeric diols, triols and tetraols such as ethylene glycol, diethylene glycol, 1,12-dodecanediol, 2,2,4-trimethylpentane-1,3-diol, the butylene glycols, trimethylol propane, glycerol, pentaerythrytol; polymeric polyols such as polyethylene glycol, polypropylene glycol, and diol and triol polyesters, monomeric dicarboxylic acids and polyesters containing, on the average, at least two carboxyl groups per molecule; and di- and poly-amines such as 2,2,6,6-tetramethylpiperazine and bis(2,2,6,6-tetramethyl-4-piperidyl)sebacate.

The isocyanate-functional polymers of this invention can also serve as backbone polymers for grafting reactions, utilizing the -NCO groups as the graft sites. Some or all of these can be reacted with polymers containing only one complementary group, such as —OH, —NH$_2$ or —NHR$_3$ and —COOH, per polymer molecule, to obtain graft polymers having the original isocyanate-functional polymer as its backbone and the original mono-functional polymers as the grafted side-chains. Preparing graft polymers in this manner is advantageous over the more common graft polymerization techniques which utilize free radical initiated grafting to sites having active hydrogen atoms. The present method affords control over the extent of grafting, from substantially complete, i.e., approximately 95% or higher, reaction of the available —NCO groups, through gradations of 80%, 50%, 20%, etc. of the number of isocyanate groups utilized.

Another way in which these isocyanate-functional polymers can be used in grafting reactions is by first reacting some or substantially all of the —NCO groups present in the polymer with polymerizable monomers containing functional groups which are reactive with the —NCO groups. These functional group-containing monomers are exemplified by hydroxyethyl acrylate, hydroxypropyl methacrylate, acrylic acid, methacrylic acid, and N-tertiaryl-butylaminoethyl methacrylate. In the second step, the polymers so obtained now containing pendent polymerizable double bonds, can be graft copolymerized with any of the conventional monomers. Such monomers are listed above.

The polymers containing pendent polymerizable double bonds, based on the isocyanate-functional polymers of this invention, can also be utilized for purposes other than to serve as the backbone polymers for further graft copolymerization. These polymers can be cured through the use of conventional free radical catalysts, ultraviolet radiation or electron-beam radiation to yield hard coatings.

The isocyanate functional polymers of this invention can also be reacted with difunctional compounds having groups of differential reactivity to provide reactive sites on the polymers which are removed farther from the polymer backbone than is commonly possible. For example, if the polymers are reacted with an amino-alcohol the product will be a polymer having hydroxyl groups removed from the chain by several carbon atoms. Some or substantially all of the isocyanate groups can be so reacted. An example of such amino alcohol is 12-aminododecane-1-ol.

Utilizing a drying oil alcohol in reacting with the isocyanate functional polymers, the resulting product is a system which can be cured in air at room temperature.

The reaction of these isocyanate-functional polymers with di-functional acids or amines or amino-acids, where the acid can be carboxylic or sulfonic acid, affords a product which, after neutralization with a suitable base, is a water dispersible or water soluble system.

The isocyanate-functional polymers of this invention are also useful in coatings which can be cured when exposed to atmospheric moisture. As an example, polymers having a number average molecular weight not exceeding 3,000, can be spray applied at greater than 60 volume % solids. One polymer, containing approximately 40–60% ICEMA, 4–15% lauryl mercaptan, and the balance butyl acrylate, is particularly useful. It can cure by absorbing moisture from the ambient atmosphere to produce a crosslinked film with the evolution of small quantities of carbon dioxide. This process can be facilitated by the presence of organometallic dryers such as dibutyltin dilaurate without compromising the one-package stability of the coating composition. Small amounts of antioxidants and UV screening chemicals can also be added for extreme exposure conditions. Such additives, however, are not usually because of the inherent stability of the crosslinked network to oxidation, hydrolysis, and light.

The property balance that can be achieved makes the moisture cured isocyanate-functional polymers suitable for coating both rigid and flexible substrates. They are particularly useful in exterior ambient temperature curing or low bake finishes for automobiles, trucks, aircraft, and railroad equipment.

A variety of substrates can be coated with coating compositions based on the isocyanate-containing polymers of this invention; the substrates can be rubbery, semi-rigid, and metallic. Examples of suitable substrates are flexible hydrocarbon rubbers such as EPDM (terpolymers of ethylene, propylene, and diene), butyl rubber, styrene-butadiene rubber, polybutadiene rubber or polyisoprene rubber; urethane and Hytrel ® (registered trademark of E. I. du Pont de Nemours and Company) polyester rubber; injection molded polyester urethane; elastoplastic microcellular urethane foam; ABS (terpolymers of acrylonitrile, butadiene, and styrene); steel; aluminum.

These coating compositions can be applied by any of the standard application methods such as spray or roller coating and brushing. When the coating is applied by spraying it is possible to utilize spray solids higher than has been customary with many commercially useful prior art coatings. Solids contents up to 100% can be obtained with low molecular weight diol crosslinking agents. The coating thickness can be from 0.002 millimeter to 0.3 millimeter, the preferred thickness being approximately 0.05 millimeter.

The coatings based on the isocyanate-containing polymers can be cured by moisture at room temperature or the crosslinking process can be carried out at room temperature or at elevated temperatures depending on the complementary functional materials and catalyst, if any, to be utilized. Curing temperatures of up to about 150° C., at times of up to about 30 minutes are often used.

The catalyst selection can depend on the complementary functional groups present, to facilitate their reaction with the —NCO groups. Among the useful catalysts are: dibutyl tin dilaurate, stannous octoate, dimethylbenzylamine, triethylenediamine, dibutyl tin oxide.

Coating compositions based on the isocyanate-containing polymers of this invention can be pigmented. Typical pigments which can be used as metallic oxides, preferably titanium dioxide, zinc oxide, iron oxide, and the like, metallic flakes such as aluminum flake, metallic powders, metallic hydroxides, "Afflair" ® Flake pigments (a registered trademark of E. I. du Pont de Nemours and Company), i.e., mica coated with titanium dioxide sulfates, carbonates, carbon black, silica, talc, china clay, and other pigments, organic dyes, and lakes. The amount of pigment utilized can depend on the type of final application of these coatings. Pigment/binder ratios between 3/100 and 100/100 can be utilized with the preferred P/B range being 3/100–50/100 for automotive applications and near the maximum P/B ratio of 100/100 for other industrial coatings.

The following examples illustrate the invention. All quantities are on a weight basis unless otherwise indicated.

EXAMPLE 1

An isocyanate-containing polymer is prepared as follows:

| Portion 1 | Parts by Weight |
| --- | --- |
| isocyanatoethyl methacrylate | 143.6 |
| methyl methacrylate | 47.8 |
| butyl methacrylate | 40.5 |
| ethyl acetate | 134.0 |
| Portion 2 | |
| lauryl mercaptan | 43.2 |
| Portion 3 | |
| isocyanatoethyl methacrylate | 95.7 |
| methyl methacrylate | 71.7 |
| butyl methacrylate | 60.6 |
| azobisisobutyronitrile | 3.25 |
| Portion 4 | |
| lauryl mercaptan | 18.5 |
| ethyl acetate | 44.6 |
| Portion 5 | |
| azobisisobutyronitrile | 0.75 |
| ethyl acetate | 25.0 |

The 2-isocyanatoethyl methacrylate contains 27.1% NCO (theory=27.1). It is 99.9% pure by gas chromatography. It contains 0.03% total chlorine and 0.009% hydrolyzable chlorine.

The polymerization vessel is a one-liter four-necked round bottomed flask fitted with a stirrer, pot thermometer and two Y tubes each carrying a reflux condenser and dropping funnel. The reaction is nitrogen blanketed.

Portion 1 is charged to the flask and heated to reflux at about 95° C. over 25 minutes. Portion 2 is then added in about 10 seconds. Portions 3 and 4 are charged to separate dropping funnels and added to the refluxing solution (temperature approximately 90° C.) over 120 minutes at a constant rate of addition. After 5 additional minutes at approximately 90° C., Portion 5 is added over 1 hour. The temperature drops to 85° C. and is held there for an additional hour.

The resulting polymer has a composition of isocyanatoethyl methacrylate/methyl methacrylate/butyl methacrylate/lauryl mercaptan (in the form of a thioalkyl group)/45.9/22.9/19.4/11.8 (by weight), a Gardner-Holdt viscosity of S, and a solids content of 71.7% by weight. The polymer is clear, colorless, free of gel particles, and does not change in viscosity or appearance over a period of four weeks.

The gel permeation chromatographically determined molecular weight is $M_w = 5,300$ and $M_n = 1,800$.

Based on the total weight of the polymer solution, the residual monomer content (weight %) is, for the monomers as listed above, 0.15, 0.22, 0.21, and 0.27, respectively.

Twenty grams of the polymer solution catalyzed with 0.1 milliliter of a 10% (in cellosolve acetate) solution of dibutyl tin dilaurate, when cast onto glass, cures with atmospheric moisture to afford a clear, colorless film having a Knoop hardness (after 1 week at 50% relative humidity) of 10 and which is impervious to ethyl acetate.

EXAMPLE 2

(A)

A polymer solution is formed by reacting the following ingredients:

| | Parts By Weight |
|---|---|
| Portion 1 | |
| Xylene | 415.39 |
| Hydroxyethyl acrylate | 218.50 |
| Phthalic anhydride | 269.50 |
| "Cardura" E ester - (a mixed ester described in U.S. Pat. No. 3,275,583, issued September 27, 1966, and is a glycidyl ester of a synthetic tertiary carboxylic acid of the formula $CH_2\!\!-\!\!\!\overset{O}{\underset{\diagdown\!\diagup}{\vphantom{O}}}\!\!\!-\!CH\!-\!CH_2\!-\!O\!-\!\overset{O}{\underset{\|}{C}}\!-\!R$ where R is a tertiary aliphatic hydrocarbon group of 8–10 carbon atoms) | 481.25 |
| Portion 2 | |
| Xylene | 621.15 |
| Portion 3 | |
| Sytrene | 567.88 |
| Methyl methacrylate 288.74 | |
| Hydroxyethyl acrylate | 99.13 |
| Tertiary butyl peroxide | 17.33 |
| Portion 4 | |
| Xylene | 363.13 |
| Cellosolve acetate | 158.00 |
| Total | 3500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting polymer solution has a solids content of about 55% and a Gardner-Holdt viscosity of about X and the polymer has an acid number less than 10. The polymer is the copolymerization and esterification product of the following reactants:

| | Parts by Weight |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.00 |

(B)

An isocyanate-containing polymer is prepared as follows:

| | Parts By Weight |
|---|---|
| Portion 1 | |
| Styrene | 390.4 |
| 2-isocyanatoethyl methacrylate | 387.1 |
| Ethyl acetate | 250.0 |
| Portion 2 | |
| Lauryl Mercaptan | 17.9 |
| Portion 3 | |
| Azobisisobutyronitrile | 17.5 |
| Ethyl acetate | 100.0 |
| Stryene | 90.8 |
| 2-isocyanatoethyl methacrylate | 131.7 |
| Lauryl mercaptan | 104.0 |

The 2-isocyanatoethyl methacrylate contains 27.1% NCO (theory=27.1). It is 99.9% pure by gas chromatography. It contains 0.03% total chlorine and 0.009% hydrolyzable chlorine.

The polymerization vessel is a 3-liter four-necked flask equipped as described in Example 1.

Portion 1 is charged to the flask and heated to reflux at 111° C. Portion 2 is then added. Reflux is maintained by heating as necessary as Portion 3 is added over 90 minutes. The mixture is allowed to reflux at 93° C. over an additional 270 minutes.

The resulting clear, colorless solution has a solids content of 76.5% by weight and a calculated monomer composition, by weight %, of styrene, 42.6; isocyanatoethyl methacrylate, 45.9; lauryl mercaptan, 10.7; fragments from azobisisobutyronitrile, 0.8, based on the assumption that ½ of the initiator weight becomes combined with the polymer.

The gel permeation chromatographically determined molecular weight is $\overline{M}_w = 3,000$ and $\overline{M}_n = 790$.

(C)

A coating composition is prepared by combining:

| | Parts By Weight |
|---|---|
| Polyol as prepared in (A) above | 15.2 |
| Toluene | 1.5 |
| Cellosolve acetate | 6.2 |
| Ethyl acetate | 4.1 |
| Dibutyltin dilaurate | 0.001 |
| Polymer as prepared in (B) above | 5.6 |

Tensile test date obtained on a cured film, approximately 0.05 millimeter thick, obtained by drawing down this composition on glass (at 10% minimum test rate), indicate the suitability of the coating for use on rigid substrates:

% elongation, 4.9; tensile strength, 5000 PSI; initial modulus, 187,000 PSI.

EXAMPLE 3

(A)

An isocyanate-containing polymer is prepared as follows:

|  | Parts By Weight |
|---|---|
| Portion 1 | |
| 2-isocyanatoethyl methacrylate | 736 |
| n-butyl acrylate | 1040 |
| Ethyl acetate | 825 |
| Portion 2 | |
| Lauryl mercaptan | 193 |
| Portion 3 | |
| Azobisisobutyronitrile | 4.4 |
| Ethyl acetate | 75 |
| 2-isocyanatoethyl methacrylate | 682 |
| n-butyl acrylate | 258 |
| Lauryl mercaptan | 206 |

The polymerization vessel is a 5-liter four-necked flask equipped as described in Example 1.

Portion 1 is charged to the flask and heated to reflux. Portion 2 is then added. Reflux is maintained by heating as necessary as Portion 3 is added over 90 minutes. Reflux is continued for an additional 210 minutes. The final polymer has a solids content of 75.0% and a viscosity of 60 centipoises.

The gel permeation chromatographically determined molecular weight is $\overline{M}_w = 5,600$ and $\overline{M}_n = 1,900$ and the polymer has the following composition, by weight: butyl acrylate, 41.6; ICEMA, 45.5; lauryl mercaptan, 12.8; fragments from azobisisobutyronitrile, 0.07.

(B)

A coating composition is prepared as follows:

|  | Parts By Weight |
|---|---|
| Polycol as prepared in Example 2(A) | 28.13 |
| Toluene | 2.8 |
| Cellusolve acetate | 11.5 |
| Ethyl acetate | 7.5 |
| Dibutyl tin dilaurate | 0.002 |
| Polymer from (A) above | 11.5 |

The film has the following tensile properties after 28 days of air drying:

elongation, 37%; tensile strength, 3500 psi; initial modulus, 118,000 psi.

This composition is suitable for use on flexible substrates.

EXAMPLE 4

An isocyanate-containing polymer is prepared as follows:

|  | Parts By Weight |
|---|---|
| Portion 1 | |
| Isocyanatoethyl methacrylate | 21.9 |
| Butyl acrylate | 45.0 |
| Ethyl acetate | 44.2 |
| lauryl mercaptan | 6.8 |
| Portion 2 | |
| Azobisisobutyronitrile | 0.01 |
| Ethyl acetate | 2.0 |
| Portion 3 | |
| isocyanatoethyl methacrylate | 52.2 |
| Butyl acrylate | 36.3 |
| Lauryl mercaptan | 15.4 |
| Azobisisobutyronitrile | 0.9 |
| toluene | 36.0 |
| Portion 4 | |
| Butyl acrylate | 68.0 |
| Isocyanatoethyl methacrylate | 76.3 |
| Toluene | 37.8 |
| ethyl acetate | 21.0 |
| azobisisobutyronitrile | 13.5 |
| Portion 5 | |
| Azobisisobutyronitrile | 0.1 |
| Ethyl Acetate | 4.0 |

The polymerization vessel is a 1-liter, four-necked flask, equipped as described in Example 1.

Portion 1 is charged to the flask and brought to reflux over 15 minutes. Portion 2 is then added. Reflux is maintained by heating as necessary as Portion 3 is added over 40 minutes. Reflux is maintained by heating as Portion 4 is added over 80 minutes. After an additional 20 minutes at reflux, Portion 5 is added and, after an additional 30 minutes at reflux, the polymerization is substantially complete. The product has a solids content of 68.2% and a viscosity of 70 centipoises. The gel permeation chromatographically determined molecular weight is $\overline{M}_w = 6,500$ and $\overline{M}_n = 2,100$ and has the following composition by weight: isocyanatoethyl methacrylate, 45.7; butyl acrylate, 45.4; lauryl mercaptan, 6.7; initiator residue, 2.2.

This polymer is self-crosslinking when exposed to ambient (50% RH) air for one week using the following mixture: 10 grams of polymer solution and 0.05 milliliter of a 10% dibutyltin dilaurate solution in cellosolve acetate.

This 68% solids solution has a viscosity of 70 centipoises and thus can be categorized as a high solids coating. It is coated on glass using a 6 mil blade to form, after a one-week cure at 25° C. (50% RH), a 0.07-millimeter thick, clear, colorless, film with a 6.1 Knoop hardness, having the following tensile properties:

elongation to break, 20%; tensile strength, 3000 psi; initial modulus, 71,000 psi.

EXAMPLE 5

A 10.0-gram portion of the polymer of Example 4 is mixed with 0.98 gram of 2-ethyl-1, 3-hexanediol and 0.05 milliliter of a 10% solution of dibutyltin dilaurate in cellosolve acetate.

This solution has a 70.9% non-volatile content and a viscosity of 65 centipoises. It has a useful working life of about two hours at 25° C.

When cast on glass and cured for one week at 25° C. and 50% RH, a clear, colorless film, approximately 0.06 millimeter thick, is produced. It has a Knoop hardness of 2.9. Its tensile properties are:

elongation to break, 29%; tensile strength, 1700 psi; and initial modulus, 35,000 psi.

EXAMPLE 6

A 40.0-gram portion of the polymer of Example 4 is mixed with 13.3 grams of a diamine, having the following structure:

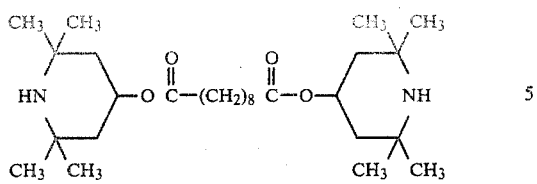

dissolved in 48.0 grams of ethyl acetate.

After casting on glass, an approximately 0.07 millimeter dry film results. After a 1-week curing period at 25° C. at 50% relative humidity, the Knoop hardness value of the film is 7.2, its elongation to break is 60%, its tensile strength is 2,800 psi, and its initial modulus is 53,000 psi.

What is claimed is:

1. A coating composition consisting essentially of
   (A) a polymeric or a low molecular weight polyfunctional material containing a functional group complementary to an isocyanate functionality selected from the group consisting of hydroxyl, amino, and carboxyl; and
   (B) a crosslinking agent which is an isocyanate-functional polymer containing at least 10%, by weight of the polymer, of copolymerized isocyanatoalkyl acrylate or isocyanatoalkyl methacrylate, wherein at least 10% by number of the polymer molecules have the following structure:

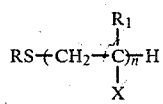

where
R is alkyl or aryl;
$R_1$ is hydrogen or methyl;
X is a COO—A—NCO or a mixture of COO—A—NCO and at least one of phenyl, $COOR_2$,

Cl, H; where
A is an alkylene group having 2-6 carbon atoms, and
$R_2$ is an alkyl group having 1-18 carbon atoms; and n is 2-400 so that the polymer has a number average molecular weight, determined by gel permeation chromatography, utilizing polystyrene standards of polydispersity less than 1.1, of 500-10,000.

2. A coating composition of claim 1 consisting essentially of
   (A) a polymer containing functional group complementary to an isocyanate functionality selected from the group consisting of hydroxyl, amino, and carboxyl; and
   (B) a crosslinking agent which is an isocyanate-functional polymer containing at least 10%, by weight of the polymer, of copolymerized isocyanatoalkyl acrylate or isocyanatoalkyl methacrylate, wherein at least 10% by number of the polymer molecules have the following structure:

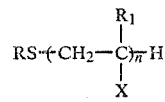

where
R is alkyl or aryl,
$R_1$ is hydrogen or methyl;
X is COO—A—NCO or a mixture of COO—A—NCO and at least one of phenyl, $COOR_2$,

Cl, H; where
A is an alkylene group having 2-6 carbon atoms, and
$R_2$ is an alkyl group having 1-18 carbon atoms;
and n is 2-400 so that the polymer has a number average molecular weight, determined by gel permeation chromatography, utilizing polystyrene standards of polydispersity less than 1.1, of 500-10,000.

3. A coating composition of claim 1 consisting essentially of
   (A) a polymer which is the copolymer of styrene, methyl methacrylate, and the esterification product of hydroxyethyl acrylate, phthalic anhydride, and a glycidyl ester of the formula

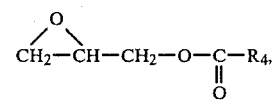

where $R_4$ is a tertiary aliphatic hydrocarbon group containing 8-10 carbon atoms; in the weight ratio of approximately 30:15:55; and
   (B) an isocyanate-functional polymer containing at least 10%, by weight of the polymer, of copolymerized isocyanatoethyl methacrylate wherein at least 10% by number of the polymer molecules have the following structure:

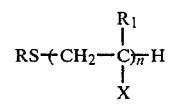

where
R is alkyl;
$R_1$ is hydrogen, methyl or mixtures thereof;
X is a mixture of COO—$CH_2CH_2$—NCO and at least one of phenyl, $COOR_2$,

Cl, and H, where $R_2$ is an alkyl group having 1-18 carbon atoms; and
n is 2-400 so that the polymer has a number average molecular weight, determined by gel permeation chromatography, utilizing polystyrene standards of polydispersity less than 1.1, of 500–10,000.

4. A coating composition of claim 1 consisting essentially of (A) a polyol and (B) a polymer of butyl acrylate, isocyanatoethyl methacrylate and lauryl mercaptan.

5. A coating composition of claim 1 consisting essentially of (A) 2-ethyl-1,3-hexanediol and (B) a polymer of butyl acrylate, isocyanatoethyl methacrylate and lauryl mercaptan.

6. A self-supporting film formed from a coating composition of claim 5.

7. A coating composition of claim 1 consisting essentially of (A) a diamine and (B) a polymer of butyl acrylate, isocyanatoethyl methacrylate and lauryl mercaptan.

8. A self-supporting film formed from a coating composition of claim 7.

9. A coating composition of claim 1 which is air-curable and wherein (A) is a drying oil alcohol.

10. A coating composition of claim 1 wherein (A) is a low molecular weight polyfunctional material selected from the group consisting of ethylene glycol, polyethylene glycol, propylene glycol, polypropylene glycol, butylene glycols, 1,12-dodecanediol, 2,2,4-trimethylpentane-1,3-diol, 2-ethyl-1,3-hexanediol, trimethylol propane, and pentaerythritol.

11. A coating composition of claim 1 wherein (A) is a low molecular weight polyfunctional material selected from the group consisting of 2,2,6,6-tetramethylpiperazine and bis (2,2,6,6-tetramethyl-4-piperidyl) sebacate.

12. A graft polymer obtained by contacting
(A) An isocyanate-functional polymer containing at least 10%, by weight of the polymer, of copolymerized isocyanatoalkyl acrylate or isocyanatoalkyl methacrylate, wherein at least 10% by number of the polymer molecules have the following structure:

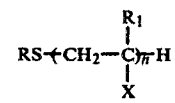

where
R is alkyl or aryl,
$R_1$ is hydrogen or methyl;
X is COO—A—NCO or a mixture of COO—A—NCO and at least one of phenyl, $COOR_2$,

Cl, H; where
A is an alkylene group having 2–6 carbon atoms, and
$R_2$ is an alkyl group having 1–18 carbon atoms;
and n is 2–400 so that the polymer has a number average molecular weight, determined by gel permeation chromatography, utilizing polystyrene standards of polydispersity less than 1.1, of 500–10,000; and (B) a substantially mono-functional polymer whose functional group is selected from the group consisting of OH, COOH, $NH_2$, and $NHR_3$, where $R_3$ is an alkyl group having 1–4 carbon atoms.

* * * * *